United States Patent Office 2,910,350
Patented Oct. 27, 1959

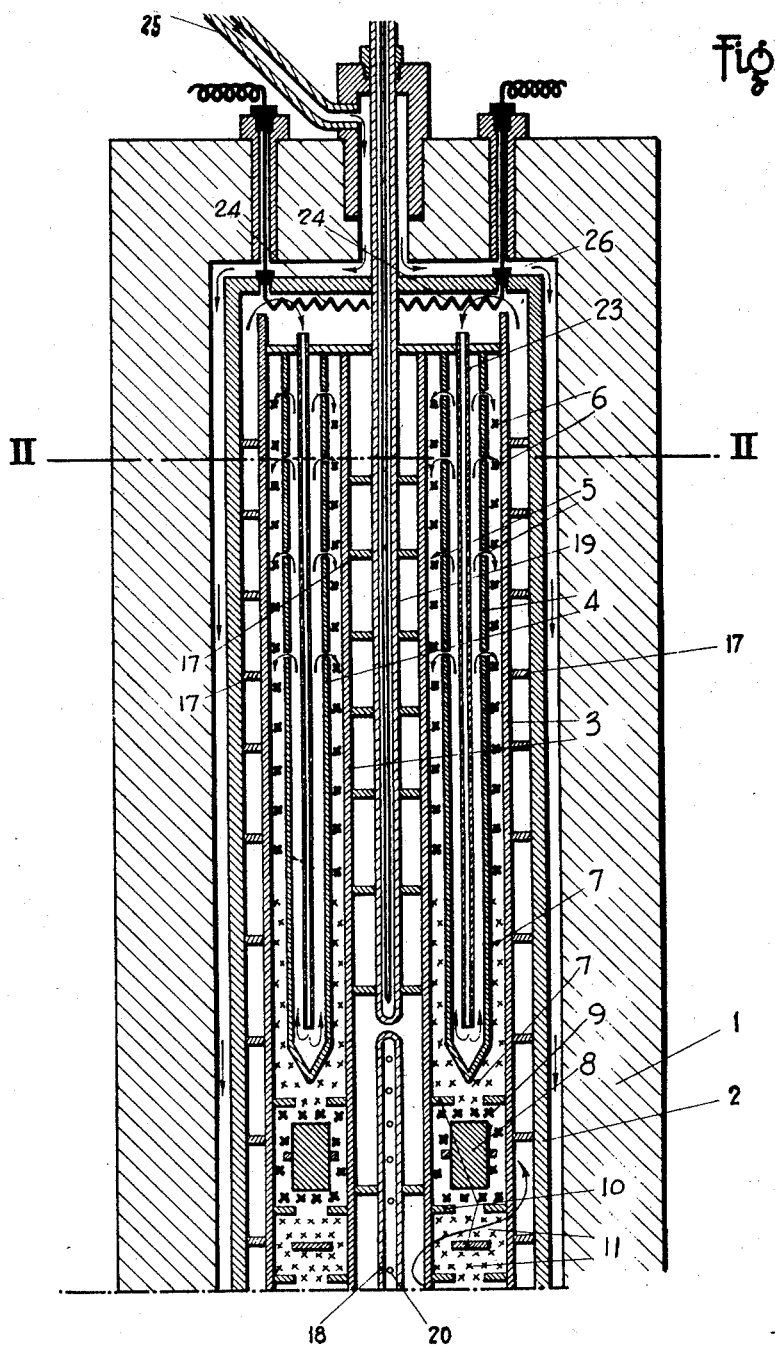
Fig. 1·a

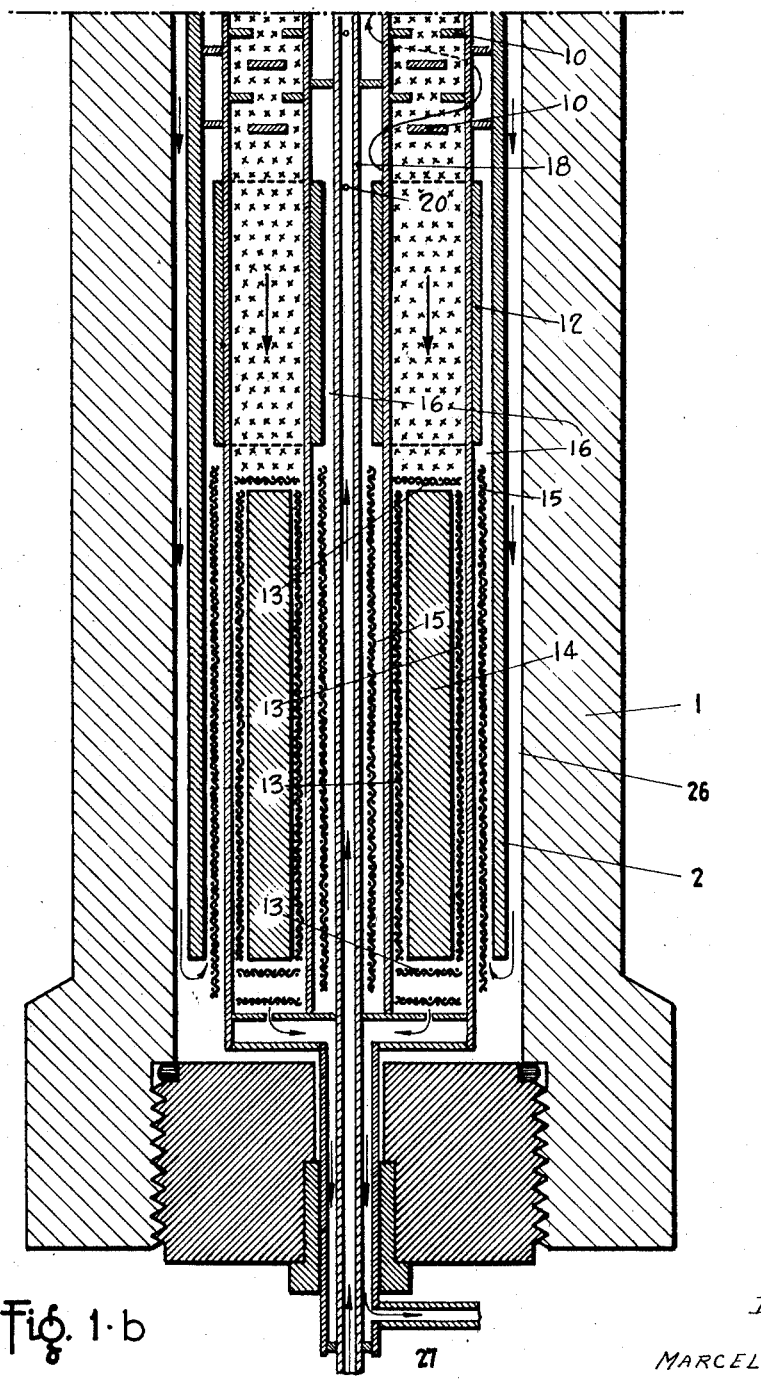
Fig. 1·b

2,910,350

APPARATUS FOR EQUALIZING THE TEMPERATURE INSIDE EXOTHERMIC REACTION CHAMBERS

Marcel Jean, Paris, France, assignor to Societe Chimique de La Grande Paroisse, Azote et Produits Chimiques, Paris, France Application February 19, 1954, Serial No. 411,499

Claims priority, application France February 23, 1953

4 Claims. (Cl. 23—289)

The present invention relates to a method for equalizing the temperature inside exothermic reaction chambers, particularly when the reactions are carried out under high pressures and at high temperatures, as, for instance, the synthesis of ammonia from its elements, the synthesis of methanol and the like.

In the French Patent No. 626,501, filed April 1, 1926, for "A Method for Equalizing the Temperature Inside Exothermic Chemical Reaction Chambers," there has been described a method for rendering the temperature as uniform as possible, consisting essentially in heating to the reaction temperature a part of the gases to be reacted by causing them to circulate first in indirect contact with the catalyzing material, then inside systems, each consisting of an inner tube opening inside an outer tube; the gases circulate inside the outer tube in opposite direction to the circulation inside the inner tube, and the gases issuing from said outer tube are distributed over the catalyzing material at the very end of said outer tube which dips into what may be called the origin of the catalyzing material, that is to say the portion of the catalyzing material opposite the exit of said gases from said material. The above tubes, similar to the Field's tubes used in boilers, are designated thereafter under the name of bell type tubes. At the same time, the other portion of the gases to be reacted having circulated for insance around the cartridge containing the catalyzing material, reaches the origin of this material for cooling said origin where the reaction is most violent. The gases then leave this origin of the catalyzing material, reacting with the remainder of the catalyzing material cooled by the bell type tubes as well as by the circulation of the gases outside the cartridge.

While this arrangement gives good results for cartridges of small dimensions, i.e. for low gas outflows, things are different in the case of important outflows; the very great amount of heat evolved must be suitably eliminated at all points of the catalyzing material and transferred to the gas mixture to be reacted for avoiding, on the one hand, a limitation of the production of the synthetic product due to an unfavorable shifting of the reaction equilibrium at high temperatures, and, on the other hand, for preventing the coalescence of the catalyzing material which, when super-heated loses its active divided condition and assumes the crystalline condition under which its catalytic efficiency is very low.

The present invention relates particularly to this case of important production by providing the various cooling means which are necessary for equalizing, as well as possible, the reaction temperature all along the path of the gases over the catalyzing material, said means being adapted to the intensity of reaction at the place where they are used.

To this end, the method according to the present invention, uses, as known, in the initial zone of the reaction, the circulation of the gas mixture to be reacted first in indirect contact with the catalyzing material, then the circulation in bell type tubes dipping in the same portions of said material, and uses also the known distribution, over the origin of said material, of the gas mixture having thus circulated and issuing from the end of the annular conduit of the bell type tubes; but said method is characterized in that use is made, for the first one of these circulations, of not a portion only but of the whole of the gas mixture, already hot, and in that, after this first circulation, the distribution of this gas mixture is continued over a portion of the circulation path in the annular conduit of the bell type tubes (this mixture being so distributed over a relatively important length of the catalyzing material), and in that, towards the end of the bell type tube zone, the gases having partly reacted are caused to pass through a portion of the catalyzing material cooled by indirect contact with lesser and lesser portions of the gas mixture to be reacted and arriving, in part, in successive portions as it circulates, without having been heated substantially above the ambient temperature, while the other portion has been heated by passing first in indirect contact with the output gases, then in indirect contact with the final portion of the catalyzing material.

The above method is particularly advantageous, specially so with relatively high gas outputs, when the catalyzing material is arranged in tubes around which the gases to be reacted circulate before entering the bell type tubes, thereby increasing the exchange area between the catalyzing material and the gases to be reacted.

On the other hand, in combination or not with the latter arrangement, it is advantageous to constitute the catalyzing material with a relatively little active material, for instance a coarse grained material or mixed with inert grains, then with a more active material, for instance finer grained. There may also be used, as a little active catalyst, a catalyst which has already been used or able to satisfactorily resist to overheating, and as an active catalyst, a different material which may be sensitive to heat.

Other arrangements which can be used separately or in combinations, are indicated in the following description of an apparatus and of a modified form of this apparatus given by way of example for carrying out the present method.

On the diagrammatic accompanying drawings,

Figures 1a and 1b represent, by arranging them along the same theoretical axis, and with Figure 1a on top and Figure 1b lower, an axial section of a tube apparatus assembly.

Figure 2 is a transverse section along line II—II of Figure 1a.

Figure 2:
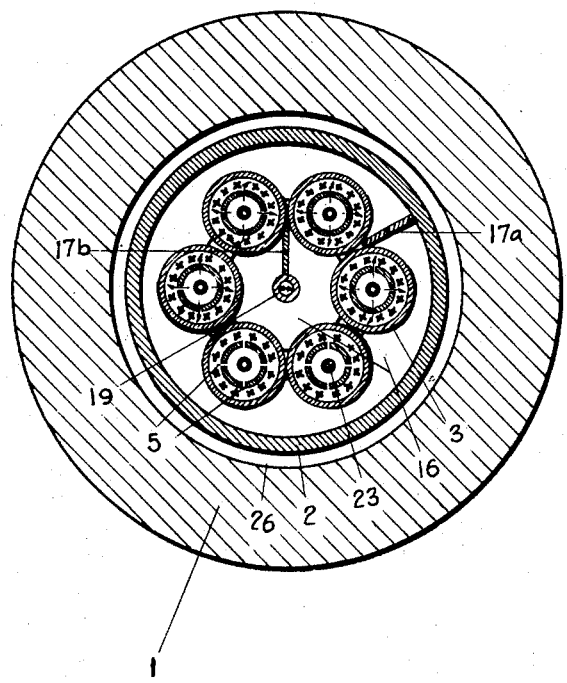
Figure 4:
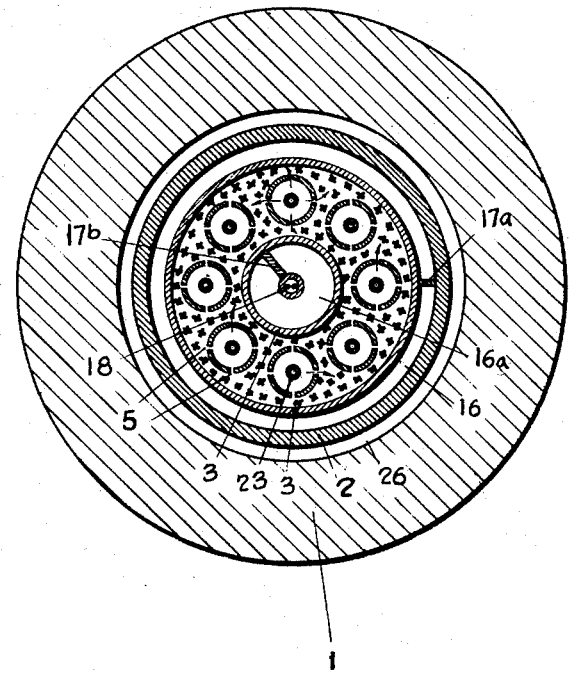
Figure 4 is a transverse section along line IV—IV of Figure 3.

The apparatus or catalysis tube of Figures 1a, 1b and 2 comprises, as known, a pressure resistant outer metal tube 1, and inside said tube and at a distance apart from its wall, the reaction chamber proper or cartridge 2 which carries on the outer surface of its wall an insulating material. This cartridge contains tubes 3 provided with a catalyzing material over the greater portion of their length and which for greater convenience in the drawings have been represented 6 in number only (see Figure 2) or 8 (Figure 4). Towards their upper end, i.e. in the zone in which the reaction begins, the tubes 3 are provided with bell type tubes 4 with an inner tube 23, said tubes 4 having towards their upper end and over a fairly great length several rows of orifices 5 opening on the catalyzing material 6 which, over the greater part of the length of the bell type tubes 4, is of a coarser grain than the catalyzing material 7 placed immediately below. Instead of being cylindrical the bell type tubes 4 might possibly be conical, the larger diameter being towards the origin of the catalyzing material. The heat exchange is thus increased, but the amount of catalyst contained in the tubes 3 is less than in the case in which cylindrical bell type tubes are used.

After the zone 7, as represented, or slightly before, i.e. slightly higher on the drawing, the cooling action is increased locally by increasing the number of orifices 20 on the tube 18 opening at the lower portion of the catalysis tube and extending along the axis of the apparatus up to a level which may reach or exceed slightly the level of the ends of the bell type tubes as shown (Figure 1a). Possibly, inert substances bodies 8, surrounded or not with catalyzing material 9, are provided, the catalyzing material being coarse grained and the grains being identical, for instance, with those of the catalyzing material 6. In the zone of the material 6, the catalyst consists of a material which is resistant to overheating. It is desirable to arrange, in the catalyzing material, baffles 10 provided with apertures (not shown) shifted from one baffle to the next and fairly close to one another. These baffles are also to be found beneath the bodies 8 but they are placed in fine grained catalyzing material 11, identical, for instance, with those of the catalyzing material 7. These baffles 10 terminate substantially at the level where the tubes 3 are possibly surrounded with a heat insulating material 12. At the lower end thereof are provided wire gauzes 13 some of which extend in the vertical direction and surround inert material bodies 14. These wire gauzes may be replaced by baffles. Other wire gauzes 15 are arranged facing vertical wire gauzes 13 in the space 16 existing between the outer wall of the tubes 3 and the inner wall of the cartridge 2. Baffles 17 are provided, over the greater part of the height of space 16 for ensuring the gas circulation around the tubes 3 in good condition for thermal exchange. These baffles may, for instance as shown, consist of a helical winding to a suitable pitch of a continuous tape 17a (Figure 2) around the surface of the tubes 3 facing outwards, and a second tape 17b between the axial tube 19 and the surface of the tubes 3 facing inwards. These two tapes 17a and 17b may be notched in order to be applied by their edges against the surfaces of the tubes 3 along a helix portion of an appreciable length. The baffles may also consist of discs or crowns the total surface of which occupies an entire cross section of the inner cavity of the reaction chamber 2 and which are perforated for the passing of the tubes 3 and of the tube 19. In this case, orifices for passing the gases are provided in these discs and placed in positions which alternate from one disc to the next. Similar baffles 17a and 17b are also provided in spaces 16a and 16 of the modified embodiment represented in Figures 3 and 4 and described hereinafter.

Along the axis of the apparatus is provided on the remainder of its length, towards its upper portion, the tube 19 containing thermo-electric couples not shown and which give the temperature of the gas mixture at various points of its path. An electric heating resistance 24 is arranged towards the upper end of the cartridge 2.

The apparatus operates as follows:

The gas mixture to be reacted arrives for its greatest part through the tube 25 at the upper portion of the apparatus; it is at a temperature close to the ambient temperature. It then flows down in the space 26 between the inner wall of the tube 1 and the outer wall of the cartridge 2, to the lower portion of the apparatus; it heats up gradually during this flowing, but owing to the presence of the insulating material covering the cartridge 2 it reaches a temperature which does not exceed that at which the ordinary steel of the tube can withstand to the working pressure.

The gas mixture, thus heated, goes up in the space 16 where it heats up rapidly in contact with the wire gauzes 15 which are heated by the outgoing gases circulating in opposite direction in contact with the grids 13. The thermal exchange is facilitated by the eddies caused by these wire gauzes which could be replaced entirely or partly by numerous baffles carefully adjusted or fins integral with the metal of the tubes.

When it reaches the level of the annular space 16 corresponding to the upper end of the exchanger formed by the inert material bodies 14, the gas mixture to be reacted enters a zone where the thermal exchange with the contents of the tubes 3 is much less intense due to the absence of baffles and due to the presence of the heat insulating material 12 so that the temperature of the gas mixture rises less rapidly than in the former zone.

Then the gas mixture to be reacted, circulating around the tubes 3 in the space 16, enters a zone provided with the baffles 17 which improve greatly the thermal exchange of these gases with the contents of the numerous tubes 3.

But the temperature increase which would result therefrom is opposed by the gradual introduction of the gas mixture to be reacted arriving at the vicinity of the ambient temperature through the tube 18 and issuing through the orifices 20. Consequently, the thermal exchange in this zone is intense but the temperature rise of the gases to be reacted is relatively slow and is effected by limited, small successive increases, being slowed down at the various levels of the orifices 20 of the tube 18 and by the arrivals of the cold gas mixture through said orifices so that on the average the temperature increase extends substantially that of the zone immediately underneath.

The gas mixture to be reacted continues to move upward circulating in the space 16 through baffles 17 around the tubes 3. The temperature of the gas mixture continues to rise in a relatively slower manner than previously.

When arrived at the upper portion of the cartridge, the gas mixture, the temperature of which is regulated by the importance of the gas flow reaching the bottom of the tube and is indicated by the thermo-electric couples in the tube 19, passes in contact with the electrical resistance 24 used for starting the reaction. It then moves down through the tubes 23 placed in the axis of the bell type tubes 4 and is not substantially heated during this displacement due to the high speed of flow of the gas mixture; when it reaches the lower end of these tubes 24 it moves upwards while heating up slightly to be distributed through the orifices 5 at various levels of the catalyzing material 6.

The reaction, which is easily started at the orifice 5 closest to the end of the cartridge, i.e. the origin of the catalyzing material, owing to the fact that the gas flow admitted at that point is relatively low, takes place at a substantially constant temperature. A superheating of the catalyst is avoided between this orifice and the closest orifice due to the fact that the evolution of heat is relatively small due to the low flow and is easily absorbed, on the one end, inwards by the cooling surface of the walls of the bell type tubes 4, particularly when those are conical as indicated above, and on the other hand outside by the external surfaces of the tubes 3, the more so that the outer surface of the latter tubes is cooled by the entirety of the gas mixture to be treated. In addition, the gas mixture coming in contact with the catalyzing material through the small orifices 5 of the lower rows, is rapidly mixed with the gases which have already circulated on the catalyzing material and which are loaded with reaction product; due to this fact the speed of the reaction is less and the heating up less sudden.

An important advantage of this arrangement resides in the fact that the amount of gas mixture going through a given volume of catalyzing material in the zone of the origin of said material is relatively small, which facilitates the starting of the reaction and the maintaining of a stable operation.

The successive arrivals of the gas mixture on the catalyzing material through the orifices 5 cool the gases which are being reacted from portions placed above each orifice and the temperature remains substantially constant in the catalyzing material, increasing only slightly between each one of the incoming levels through the orifices 5 of the successive fractions of the gas mixture which are to react. This stepped introduction of the gas mixture through the orifices 5 has, as a consequence, a spreading of the evolution of heat towards a region of the catalyzing material where the temperature difference between the gases being reacted and the gas mixture to be reacted, is larger and consequently the temperature exchange is easier.

The use, in this zone, of a coarse grained catalyzing material 6 offering therefore to the gases a lesser contact area, contributes to avoiding too rapid a temperature rise and at the same time it decreases locally the load loss. Further, the use in that region of a catalyst having a good resistance to super-heating ensures the constancy of the catalytic action.

In addition, it is possible, if necessary, to equalize the temperature by extending the tube 18 over a part of the length of the bell type tubes, this tube bringing portions of the gas mixtures substantially at the ambient temperature, through the orifices 20.

At the end of the path of the gas mixture over these large grains of catalyzing material, an important production of the synthesis product is already obtained, so that the composition of the gas mixture being closer to equilibrium, too rapid an evolution of the reaction is no longer to be feared nor, consequently, too rapid a temperature rise; this explains why the tubes 3 are provided with a catalyzing material 7 the same composition with fine grains, for instance like those used heretofore.

When the gases circulating over the catalyzing material have reached the ends of the bell type tubes, the cooling of the catalyzing material is then effected only through the outer surfaces of the tubes 3. In order to substantially avoid an excessive increase of the temperature of the gases to be reacted, in the path which starts from this end, the thermal exchange is improved by the presence of baffles 10 and possibly by a decrease in the amount of the product formed, or even by suppressing this formation; this is effected by an intense local cooling due to the increase in the number of orifices 20 on the inner tube 18, or possibly by the cylinders of inert material 8 of relatively short length. These cylinders are or are not surrounded with a coarse grained catalyzing material 9 and might be arranged in several superposed layers between layers of the catalyzing material.

In the path of the gases being reacted which starts from the cylinders 8, the heating of the gas is limited by the presence of the numerous baffles 10 which facilitate the thermal exchange, as well as the outside cooling already mentioned due to the cold gas mixture arriving through the central tube 18 and flowing through the apertures 20. This tube 18 may be heat insulated, if desired.

In this path, the reaction continues its development at a substantially constant temperature, but it becomes slower and slower as the gas contents approach equilibrium, so that the temperature has a tendency to drop. From this time on, a highly active catalyst is used; the latter may be fine-grained and have a composition different from that of the previous catalyst; the essential property required from this fine grained catalyst, which is not subjected to super-heating, is a high reactivity while the essential property of the previous catalyst is a resistance to super-heating and to the action of catalyst contaminators. The efficiency of the thermal exchange is decreased by suppressing the baffles and surrounding the tubes 3 with a heat insulating material 12. In this zone, the temperature keeps dropping slowly so that over the greatest possible length of the catalyzing material it keeps at a temperature slightly higher than the temperature at which the catalyzing material put in operation in this zone begins to act.

At the arrival of the gases at the end of this path, the maximum contents in synthetic product is substantially obtained and the gas mixture is then subjected to a rapid cooling by a circulation in the exchanger closed by the inert material cylinders 14 surrounded by wire gauze or baffles 13.

The mixture of gases thus partly cooled comes out of the catalysis tube through 27 (at about 250–300° C. for instance) to be cooled again still more outside and for the separation of the synthetic product.

The above devices, from their issuing from the zone of bell type tubes to the end of the cartridge, make it possible to effect, as in the zone of the bell type tubes, a reaction which approaches a much more constant temperature than in former devices, the difference reaching possibly 100° C. It results therefrom a very important improvement in the life of the catalyzing material, a better behaviour of the catalysis equipment and a very substantial improvement in the amount of the synthesis product in the issuing gas, so than an important increase is obtained in the production per volume unit of the catalyzing material used.

Figure 3:
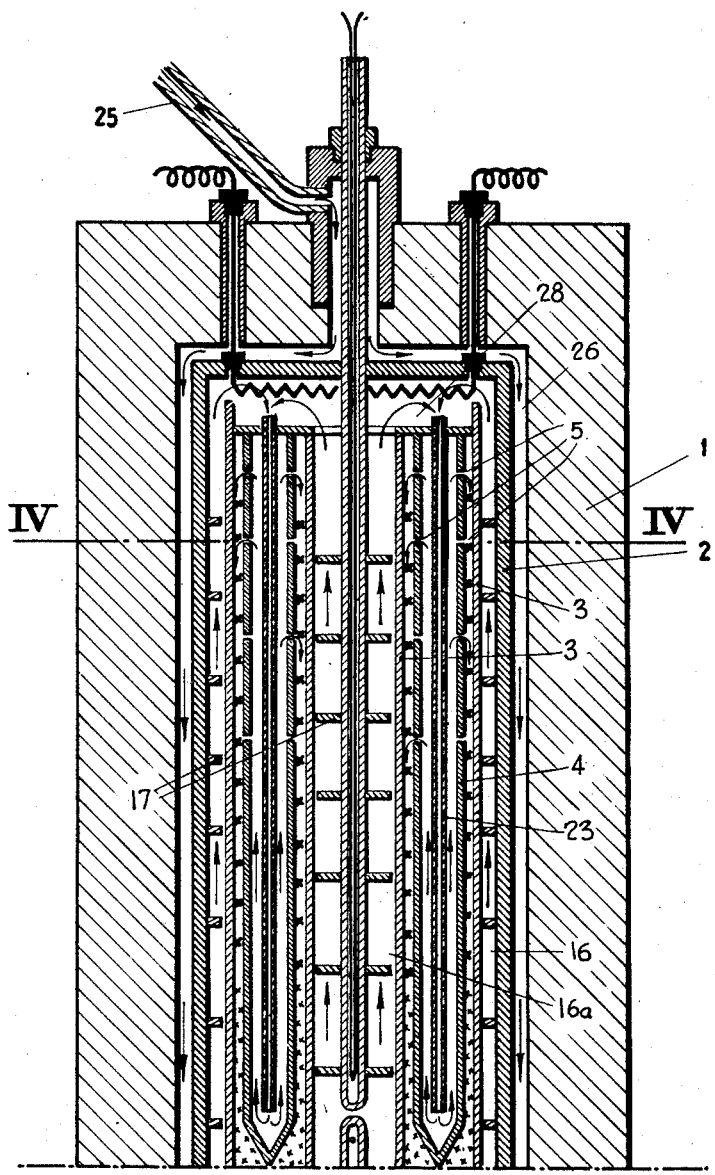
Figure 3 is a view corresponding to Figure 1 for a modification of the apparatus of Figures 1a and 1b, in which the catalyzing material is placed inside an annular chamber.

Figures 3 and 4 relate to a modification of the above apparatus in which the catalyzing material is placed in an annular chamber; the same numerals indicate the same elements, but here, the space in which the gases to be reacted circulate is formed by the central space 16a, and by the annular space 16, between the outer chamber and the wall of the cartridge 2. The result is that the mixture of the gases to be reacted and which has circulated in this central space 16a and the gases which have circulated through the annular space 16 is effected only at the upper end of the cartridge at the very origin of the catalyzing material in the chamber 23. The mixture of these two gases then circulates as in the above example in the inner tubes of the bell type tubes.

What I claim is:

1. An apparatus for the synthesis of ammonia by the passage of a gaseous mixture comprising nitrogen and hydrogen in their combining proportions through a catalyst contained in reaction tubes comprising an external closed tube for resisting the pressure and provided with intake means for the gaseous mixture and discharge means for the gaseous mixture, an envelope open at its lower end coaxial with the closed tube and having its wall spaced from the internal surface of said tube, reaction tubes in said envelope, plates covering the upper and lower ends of said reaction tubes, said tubes having intake and discharge ends and containing a catalyst except in a part thereof adjacent their discharge ends and disposed in the envelope about its axis and parallel to said axis, each of said reaction tubes containing in a part of its length from the intake end to a region spaced from its intake end a distributing bell-type tubular section closed at its lower end and provided with distributing orifices along the upper wall surfaces adjacent the intake end of the reaction tube, inner concentric tubes disposed coaxially of the envelope and extending into the tubular sections adjacent the closed ends of the distributing bell-type tubular sections which are disposed within the catalyst-containing members, a feed tube extending into the lower end of the envelope through said bottom closure plate between the reaction tubes for introducing the other part of the gaseous mixture into the envelope about the exterior of the reaction tubes, said feed tube having its discharge located exteriorly of and between the ends of the reaction tubes in the vicinity of the inner ends of the distributing bell-type tubular sections, and a central discharge tube concentric with said feed tube extending from said catalyst-containing members.

2. An apparatus for the synthesizing of ammonia according to claim 1 in which the reaction tubes are provided with external baffles which extend substantially over the part of their length, into which the distributing bell-type tubular sections extend, and means for increasing the exchange of heat on part of their length which is free of the catalyst.

3. An apparatus for the synthesizing of ammonia according to claim 1 in which the reaction tubes are provided with internal baffles in the mass of the catalyst, which is not in contact with the distributing bell-type tubular section.

4. An apparatus for the synthesizing of ammonia according to claim 3 in which each reaction tube is surrounded by an external heat-insulated layer in the region between the terminal end of the catalyst mass and the extreme baffle embedded in the catalyst.

References Cited in the file of this patent

UNITED STATES PATENTS

| | | |
|---|---|---|
| 1,909,378 | Richardson | May 16, 1933 |
| 1,980,718 | Edmonds | Nov. 13, 1934 |
| 2,032,652 | Chaffaut | Mar. 3, 1936 |
| 2,052,326 | Uhde | Aug. 25, 1936 |